July 25, 1933.　　　D. E. TRUCKSESS　　　1,919,814
ELECTRIC CONTROL SYSTEM
Filed Jan. 4, 1929
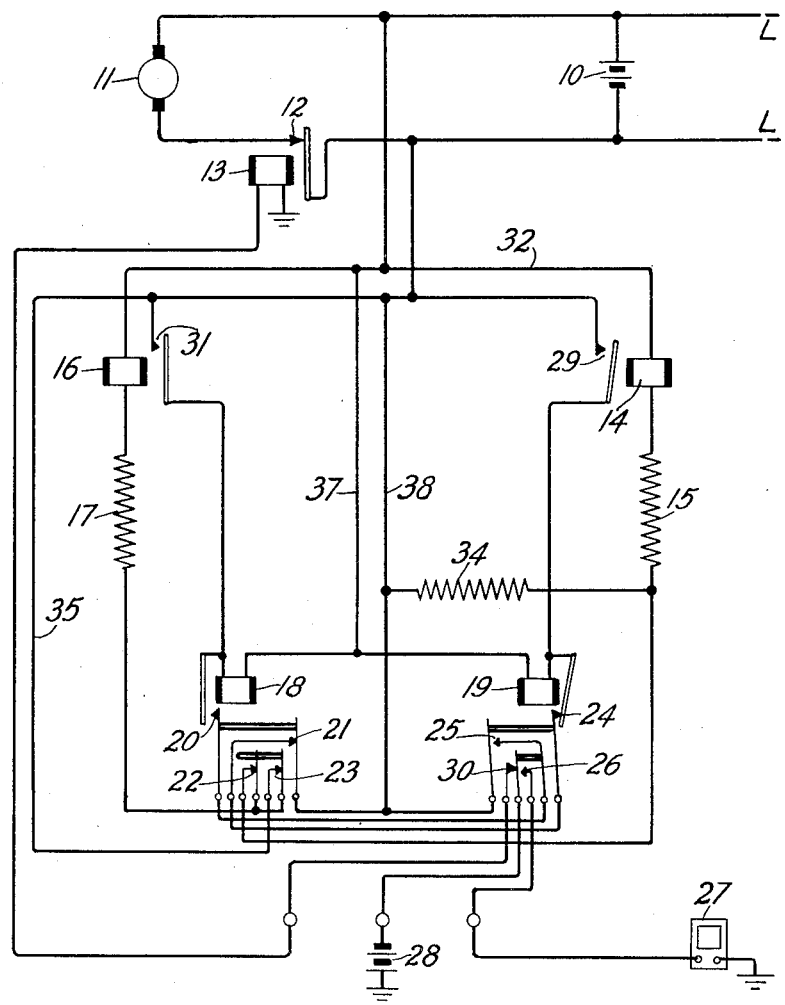
INVENTOR
D. E. TRUCKSESS
BY
　H G Bandfield
　　ATTORNEY Patented July 25, 1933

1,919,814

UNITED STATES PATENT OFFICE

DAVID E. TRUCKSESS, OF NEW YORK N. Y., ASSIGNOR TO BELL TELEPHONE LABORATORIES, INCORPORATED, OF NEW YORK, N. Y., A CORPORATION OF NEW YORK

ELECTRIC CONTROL SYSTEM

Application filed January 4, 1929. Serial No. 330,187.

This invention relates to electric control systems and more particularly to a system especially adapted for the automatic charging of storage batteries.

There is a continually increasing demand for the employment of storage batteries under conditions which make it desirable and often necessary to provide an automatic system for maintaining the batteries properly charged. Such for example, is the case in connection with storage batteries employed in private branch telephone exchanges where there is no one in constant attendance to look after the charging of the battery and also in isolated plants which are used for farm lighting systems where there is seldom anyone available who is properly skilled in the handling of such apparatus. Heretofore, in the various arrangements which have been employed for the automatic charging of such batteries it has been customary to use special designed relays which require frequent adjustment.

In accordance with this invention the voltage of a battery may be regulated by means of an electrical circuit comprising a low voltage relay, which is designed to be released at a definite voltage, a high voltage relay, which is designed to be actuated at a definite voltage, and means for insuring the proper operation therof. By adjusting the operating limits of these high-low voltage relays the voltage of a system may be kept within very narrow limits.

In the preferred form of this invention, as diagrammatically illustrated in the single figure of the drawing, the circuit employed comprises five standard inexpensive relays, one of which is designed to operate at a predetermined high voltage point and in operating to cause a third relay to release thereby releasing the fifth or line relay which serves to disconnect the battery from the charging means. A second relay is designed to release at a predetermined low voltage point and in releasing to cause the third relay to operate thereby operating the fifth or line relay which serves to connect the battery to the charging means. A fourth relay is utilized to change the resistances in the circuit so that the high and low voltage relays will operate or release at the proper values.

A clearer understanding of this invention may be had by reference to the accompanying drawing in which 10 is a storage battery, the voltage of which is to be maintained within predetermined limits by voltage supplied from generator 11 when contact 12 of the line relay 13 is closed. A low voltage relay 14 which is designed to release when the voltage of the system decreases to a predetermined low voltage value is connected in series with a resistance 15 and remains operated when the voltage of the system is above the predetermined low voltage value. A high voltage relay 16 which is designed to operate when the voltage of the system increases to a predetermined high voltage value is connected in series with resistance 17 and remains in non-operated position when the voltage of the system is below the predetermined high voltage value. Control relays 18 and 19, which serve to change the resistance in the circuit so that the high-low voltage relays will be in condition to operate or release at the proper time, are interlocked so that when one is operated, the other is released and vice versa. In the operation of relay 18, contact 20 closes before contact 21 opens and contact 21 opens before contacts 22 and 23 open. In the operation of relay 19 contact 24 closes before contact 25 opens and contact 25 opens before contact 26 opens and contact 30 closes. An alarm 27, which for example may be a lamp or bell serves to indicate whether or not the voltage of the battery is above or below the predetermined low voltage value.

In operation, when the battery is being charged relays 13, 14 and 19 are operated as shown in the drawing and relays 16 and 18 are released. Relay 13 is operated by current from battery 28 through contact 30 of relay 19. Relay 14 is operated by current from the positive side of battery 10, conductor 32, winding of relay 14 resistance 15, contacts 22 and 23 of relay 18, conductor 35 back to the negative side of battery 10. Relay 19 is locked in operated position by current from the positive side of battery 10 through conductor 37, winding and contact 24 of relay 19, contact 21 of relay 18, conductor 38, back to the negative side of battery 10. Under these conditions the voltage of the system will continue to rise until the predetermined high voltage limit is reached, at which time relay 16 will operate by current from the positive side of battery 10 through winding of relay 16, resistance 17, contact 20 of relay 18, conductor 35 back to the negative side of battery 10. Relay 16 in operating closes contact 31 thereby completing a circuit through relay 18 from the negative side of battery 10, contact 31 of relay 16, winding of relay 18, conductor 37 back to the positive side of battery 10. Relay 18 in operating performs three steps in the travel of its armature. First it closes contact 20 thus partially preparing a locking circuit for relay 18. The next step opens contact 21 of relay 18 thereby breaking the locking circuit through relay 19 causing it to release. Relay 18 in the meantime is held in operated position by current from the negative side of battery 10, contact 31, winding of relay 18, conductor 37 back to the positive side of the battery. The last step opens contacts 22 and 23. Opening contact 22 removes a short circuit from resistance 34 which decreases the current in relay 14 but not enough to release it. Opening contact 23 breaks the circuit through the high voltage relay 16 and releases it but in the meantime relay 18 becomes locked in operated position when relay 19 releases through the closing of contact 25. Relay 19 in releasing also opens contacts 24 and 30 and closes contact 26. Opening contact 24 also breaks the locking circuit through relay 19. Opening contact 30 breaks the circuit through relay 13 allowing contact 12 to return to its non-operated position thereby breaking the charging circuit from the generator 11. Closing contact 26 completes a circuit from the battery 28 through alarm 27 causing it to indicate that the charging circuit has been disconnected. When relay 16 releases it opens contact 31 thereby breaking the energizing circuit through relay 18, but relay 18 remains in operated position by virtue of its holding circuit.

As soon as the charging current is cut off, the voltage of the battery will of course start to fall slightly due to the load on line LL. When the voltage has decreased to the predetermined low voltage limit, the low voltage relay 14 releases due to the current flowing through its winding and resistances 15 and 34 being reduced to the releasing point of the relay. Relay 14 in releasing closes contact 29 thereby causing relay 19 to operate by completing a circuit through relay 19 from the positive side of battery 10, conductor 37, winding of relay 19, contact 29 of relay 14 and back to the negative side of battery 10. Relay 19 in operating performs three steps in the travel of its armature. On the first step, contact 24 is closed thereby partially preparing a locking circuit for relay 19. The second step opens contact 25 thereby breaking the circuit through relay 18 and releasing it. When relay 18 releases, it closes contacts 21, 22 and 23. Closing contact 23 completes a circuit through relay 16 but the current through relay 16 and resistance 17 is too small to operate the relay. Closing contact 21 locks relay 19 in operated position by completing a holding circuit from the positive side of battery 10 through conductor 37, contact 24 of relay 19, contact 21 of relay 18, conductor 38, back to the negative side of the battery 10. Closing contact 22 short circuits resistance 34 and prepares an energizing circuit for relay 14. The third step closes contact 30 and opens contact 26. Contact 30 in closing completes a circuit through relay 13 causing it to operate and close contact 12 which completes a circuit from the generator 11 through battery 10. Contact 26, in opening, breaks the circuit through alarm 27 thereby extinguishing the lamp to indicate that the charging circuit has been connected.

What is claimed is:

1. A control system comprising a pair of control relays, a high voltage relay adjusted to operate when the voltage of the system has reached a predetermined value, means responsive to the operation of the high voltage relay for actuating one of said control relays, means including said actuated control relay for releasing the other of said control relays and for releasing said high voltage relay and means responsive to the release of said second mentioned control relay for locking the first mentioned control relay in actuated position.

2. A control system comprising a pair of control relays, a high voltage relay, means responsive to the operation of said high voltage relay for actuating one of said control relays, means including said actuated control relay for releasing the other of said control relays and for releasing said high voltage relay, and means including the second mentioned control relay for locking said actuated control relay in actuated position.

3. A control system comprising a line relay, a high voltage relay and a pair of control relays, the operation of the line relay being directly under the control of one of said control relays, means including said high voltage relay for actuating the other of said control relays, means including said second control relay for releasing the first mentioned control relay and for releasing said high voltage relay after the voltage of the system has reached a predetermined value, and means including said first mentioned control relay for locking said second control relay in actuated position.

4. In a battery charging system including a source of charging current, a high voltage relay and a pair of control relays, means responsive to the operation of the high voltage relay for actuating one of the control relays and for releasing the other control relay, and means responsive to the release of the second control relay for disconnecting said source of charging current.

5. In a battery charging system including a source of charging current, a high voltage relay and a pair of control relays, means responsive to the operation of the high voltage relay for actuating one of said control relays, means including the other of said control relays for locking the first mentioned control relay in actuated position, and means responsive to the operation of said second mentioned control relay for disconnecting said source of charging current.

6. A control system comprising a pair of control relays, a low voltage relay, adjusted to release when the voltage of the system decreases to a predetermined value, and means responsive to the release of the low voltage relay for actuating one of said control relays and for releasing the other of said control relays, and means responsive to the release of the second-mentioned control relay for locking the first-mentioned control relay in operated position and for establishing a second, auxiliary, energizing circuit for said low voltage relay.

7. In a battery charging system including a source of charging current, a low voltage relay adapted to release when the voltage of the system decreases to a predetermined low voltage value, a high voltage relay adapted to operate when the voltage of the system increases to a predetermined high voltage value, a pair of control relays, means responsive to the operation of the high voltage relay for actuating one of the control relays and for releasing the other control relay, means responsive to the release of the second control relay for disconnecting said source, means responsive to the operation of the low voltage relay for releasing the first mentioned control relay and operating the second mentioned control relay and means responsive to the operation of the second mentioned control relay for connecting said source.

8. In a battery charging system including a source of charging current, a high voltage relay and a pair of control relays, means responsive to the operation of the high voltage relay for actuating one of said control relays, means responsive to the actuation of said control relay for releasing the other of said control relays and said high voltage relay, means including said second mentioned control relay for locking said actuated control relay in actuated position and means responsive to the operation of the second mentioned control relay for disconnecting said source.

9. A control system comprising a low voltage relay, a high voltage relay, a pair of control relays, means responsive to the operation of the high voltage relay for actuating one of said control relays, means responsive to the actuation of said control relay for releasing the other of said control relays and said high voltage relay, means responsive to the release of said second mentioned control relay for locking the first mentioned control relay in operative position, means responsive to the release of said low voltage relay for operating said second mentioned control relay, means responsive to the operation of said second mentioned control relay to release said first mentioned control relay and means responsive to the release of said first mentioned control relay for locking said second mentioned control relay in operated position.

10. In a battery charging system including a source of charging current, a low voltage relay, a high voltage relay, a pair of control relays, means responsive to the operation of said high voltage relay for operating one of said control relays, means responsive to the operation of said control relay for releasing the other of said control relays and said high voltage relay, means responsive to the release of said second mentioned control relay for locking said first mentioned control relay in operated position and for disconnecting said source, means responsive to the release of said low voltage relay for operating said second mentioned control relay, means responsive to the operation of said second mentioned control relay for releasing said first mentioned control relay and for connecting said source and means responsive to the release of said first mentioned control relay for locking said second mentioned control relay in operated position.

DAVID E. TRUCKSESS.